United States Patent
Pleuss et al.

(10) Patent No.: US 6,688,103 B2
(45) Date of Patent: Feb. 10, 2004

(54) APPARATUS FOR FASTENING AN EXHAUST GAS TURBOCHARGER ON AN EXHAUST CHAMBER OF A COMBUSTION ENGINE

(75) Inventors: Christoph Pleuss, Weissach (DE); Michael Kühnel, Rotfelden-Ebhausen (DE); Werner Engl, Calw (DE)

(73) Assignees: Dr. Ing. h.c.F. Porsche AG, Stuttgart (DE); Friedrich Boysen GmbH & Co. KG, Altensteig (DE)

( * ) Notice: Subject to any disclaimer, the term of this patent is extended or adjusted under 35 U.S.C. 154(b) by 0 days.

(21) Appl. No.: 10/175,155

(22) Filed: Jun. 20, 2002

(65) Prior Publication Data

US 2003/0005694 A1 Jan. 9, 2003

(30) Foreign Application Priority Data

Jun. 21, 2001 (DE) .......................... 101 29 916

(51) Int. Cl.[7] .............................. F02B 33/44; F01N 5/04
(52) U.S. Cl. ..................... 60/605.1; 60/605.3; 60/323
(58) Field of Search ..................... 60/605.1, 605.3, 60/323

(56) References Cited

U.S. PATENT DOCUMENTS

| | | | |
|---|---|---|---|
| 4,318,273 A | | 3/1982 | Nohira et al. |
| 4,503,680 A | * | 3/1985 | Wood ..................... 60/605.1 |
| 4,514,986 A | * | 5/1985 | Benson ..................... 60/323 |
| 4,583,367 A | | 4/1986 | Kapfer et al. |
| 5,406,795 A | * | 4/1995 | Raub et al. ............. 60/605.1 |
| 5,566,548 A | * | 10/1996 | Khurana ..................... 60/323 |
| 5,934,070 A | * | 8/1999 | Lagelstorfer ............ 60/323 |
| 6,062,024 A | * | 5/2000 | Zander et al. ............ 60/323 |

FOREIGN PATENT DOCUMENTS

| | | | | |
|---|---|---|---|---|
| DE | 1909424 | | 12/1971 | |
| DE | 3341119 | | 6/1985 | |
| DE | 3546461.5 | | 2/1987 | |
| DE | 19645384 A1 | * | 5/1998 | ........... F02B/37/02 |
| DE | 19726750 A1 | * | 1/1999 | ........... F16B/5/02 |
| DE | 19819946 | | 11/1999 | |
| EP | 0955453 | | 11/1999 | |
| GB | 1222304 | | 2/1971 | |
| JP | 11006440 A | * | 1/1999 | ........... F02B/39/00 |

* cited by examiner

Primary Examiner—Thomas Denion
Assistant Examiner—Thai-Ba Trieu
(74) Attorney, Agent, or Firm—Crowell & Moring LLP

(57) ABSTRACT

An arrangement is provided for fastening an exhaust gas turbocharger on an exhaust gas manifold of an internal-combustion engine. A manifold flange is provided at the exhaust gas manifold, on which manifold flange an exhaust gas turbocharger can be fastened which is also provided with a flange surface. It is provided that the manifold flange provided on one side of the exhaust gas manifold is connected with sleeves leading to the opposite side of the exhaust gas manifold, in which sleeves screws are guided for the fastening of the exhaust gas turbocharger. This permits a simple and easily accessible mounting or demounting of the exhaust gas turbocharger on the exhaust gas manifold of the internal-combustion engine.

27 Claims, 2 Drawing Sheets

APPARATUS FOR FASTENING AN EXHAUST GAS TURBOCHARGER ON AN EXHAUST CHAMBER OF A COMBUSTION ENGINE

BACKGROUND OF THE INVENTION

This application claims the priority of German application 101 29 916.8, filed in Germany on Jun. 21, 2001, the disclosure of which is expressly incorporated by reference herein.

The invention is based on an arrangement for fastening an exhaust gas turbocharger to an exhaust gas manifold of an internal-combustion engine.

From German Patent Document DE-AS 1 909 424 or U.S. Patent Document U.S. Pat. No. 4,318,273, internal-combustion engines are known in the case of which an exhaust gas turbocharger is flanged to the exhaust gas manifold, which exhaust gas turbocharger, in a known manner, utilizes the energy of the exhaust gas for delivering the fresh gases into the cylinders. For the exhaust-gas-side linking and fastening of the exhaust gas turbocharger to the exhaust gas manifold, the two components are provided with a flange, which are both connected by a nut-screw connection. As an alternative, threaded openings may also be made in one of the two flanges, in which threaded openings, fastening screws are received.

However, in the case of such a flange fastening, the access to the fastening screws and fastening nuts respectively may be problematic because the clearances on both flange sides are often not sufficient for the tools, for example, the wrenches or short box spanners.

It is therefore an object of the invention to develop an arrangement for the fastening of the exhaust gas turbocharger to the exhaust gas manifold of the internal-combustion engine, in the case of which a simple and easily accessible mounting or demounting of the exhaust gas turbocharger is permitted.

This object is achieved according to certain preferred embodiments of the invention by providing an arrangement for fastening an exhaust gas turbocharger to an exhaust gas manifold of an internal-combustion engine, having a manifold flange provided at the exhaust gas manifold, on which manifold flange an exhaust gas turbocharger can be fastened which is also provided with a flange surface, wherein the manifold flange is provided on one side of the exhaust gas manifold and is connected with sleeves leading to an opposite side of the exhaust gas manifold, in which sleeves fastening screws are guided for the fastening of the exhaust gas turbocharger.

By means of sleeves arranged at the flange of the exhaust gas manifold, the mounting plane for the fastening screws is displaced to the other side of the exhaust gas manifold, on which a sufficient mounting clearance is ensured. As a result, the exhaust gas turbocharger can be mounted rapidly and easily, and the use of automated screwing tools is permitted.

Other advantageous embodiments and improvements of the arrangement according to the invention are described herein and in the claims.

According to certain preferred embodiments of the invention the sleeves advantageously reach through the exhaust gas manifold pipe and are connected with the latter on a top side preferably by means of welding.

According to certain preferred embodiments of the invention for linking the sleeves to the flange of the exhaust gas manifold, the flange is provided with fastening openings, into which a fastening connection piece of the sleeves engages, the sleeves being connected with the exhaust gas manifold flange in a substance-locking manner.

The exhaust gas manifold is advantageously constructed as a double pipe according to certain preferred embodiments of the invention, the sleeves reaching through the outer pipe of the exhaust gas manifold. As a result of the displacement of the mounting plane by way of the course of the gas-carrying inner pipes, the required cross-sections of the inner pipes can be implemented while the space requirement for the exterior geometry of the exhaust gas manifold is minimized. Because of the fact that the sleeves are arranged in the air gap of the exhaust gas manifold created by the double pipe, a thermal decoupling of the sleeves from the hot exhaust gases takes place so that the weld seam points in the area of the sleeves as well as the screwed connection are less stressed by temperature.

According to certain preferred embodiments of the invention, the materials used for the fastening screws and the sleeves are coordinated such with respect to their coefficients of thermal expansion that a durable screwed connection can be achieved without an additional screw locking. A tempering steel, for example, can be used as the screw material, while special steel can be used as the sleeve material. As a result of the selection of such a sleeve material, the weldability with the outer shell of the exhaust gas manifold is simultaneously ensured.

According to certain preferred embodiments of the invention, the openings provided in the fastening flange of the exhaust gas turbocharger are provided with an internal thread in which the external thread of the fastening screws is received.

Other objects, advantages and novel features of the present invention will become apparent from the following detailed description of the invention when considered in conjunction with the accompanying drawings.

DETAILED DESCRIPTION OF THE EMBODIMENT

Figure 1:
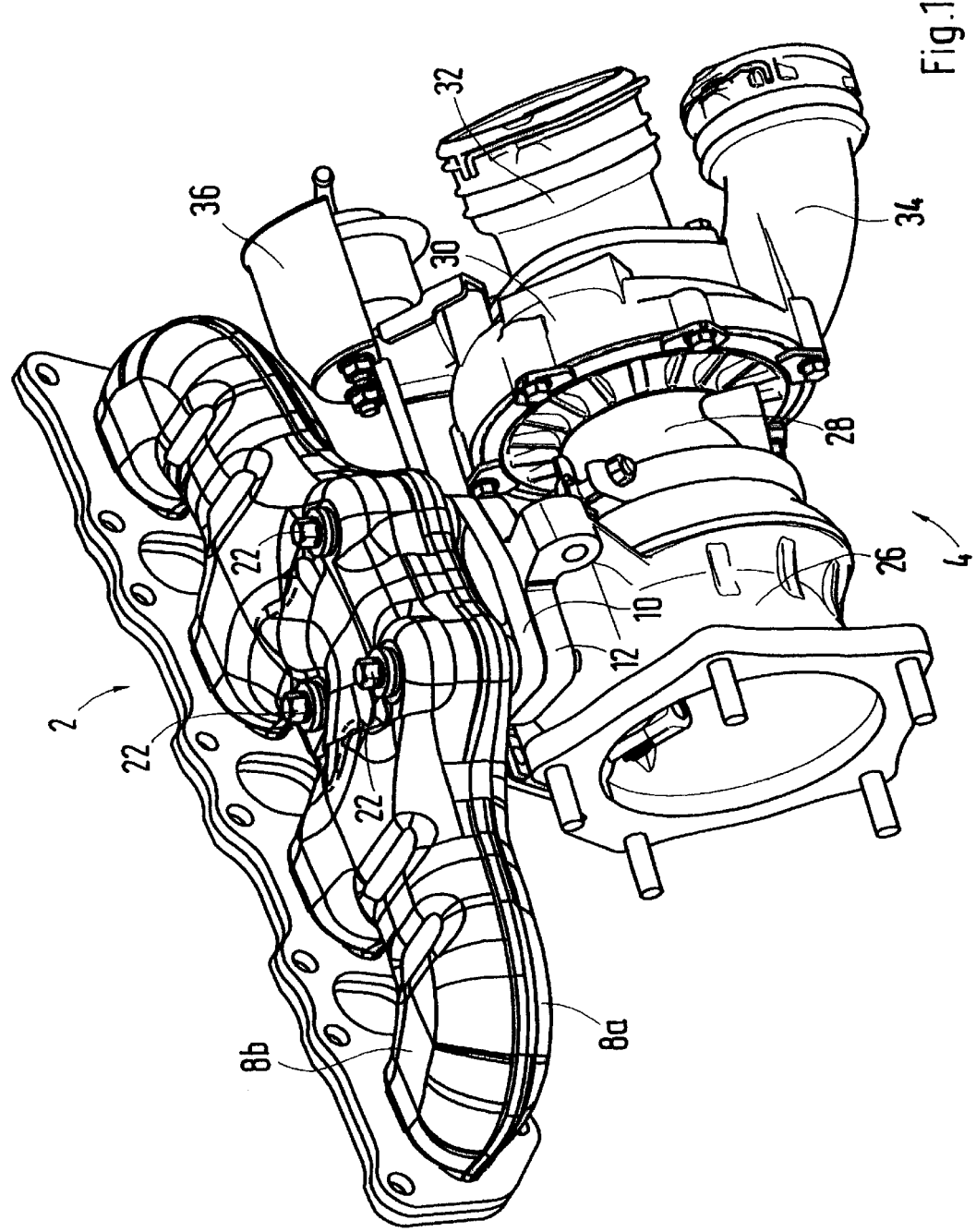
FIG. 1 is a perspective view showing a fastening arrangement for an exhaust gas turbocharger on the exhaust gas manifold of an internal-combustion engine according to certain preferred embodiments of the invention.
Figure 2:
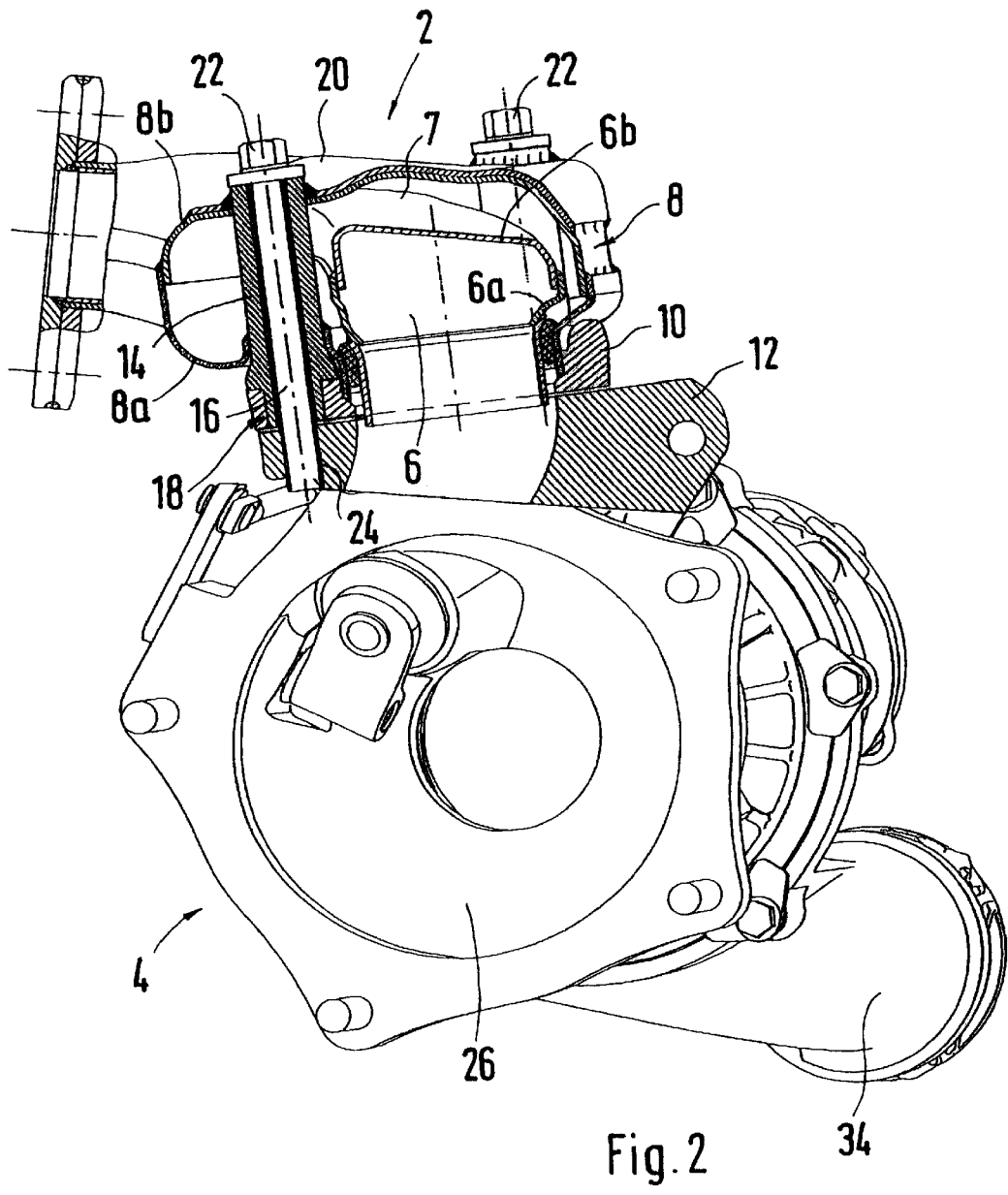
FIG. 2 is a sectional view of the fastening arrangement of FIG. 1.

An exhaust gas turbocharger 4 is fastened to an exhaust gas manifold 2 for a multi-cylinder internal-combustion engine. The exhaust gas manifold 2 has a gas-carrying inner pipe 6 which, while maintaining a space 7 or an air gap, is surrounded by an outer pipe 8. The gas-carrying inner pipe 6 as well as the outer pipe 8 of the exhaust gas manifold 2 comprise a bottom shell 6a or 8a and of a top shell 6b or 8b. Both bottom shells 6a, 8a are welded to the top shells 6b, 8b.

The bottom side of the exhaust gas manifold 2 is provided with a flange 10 to which the exhaust gas turbocharger 4 is fastened which is also provided with a flange 12. For this purpose, the present embodiment provides three sleeves 14 which reach through the outer pipe 8 and in which fastening screws 16 for the exhaust gas turbocharger 4 are guided or received. The three identically constructed sleeves 14 (only one is shown in a sectional view) have a fastening connection piece 18 at their lower end, which fastening connection piece 18 is received in passage openings provided in the exhaust gas manifold flange 10, in which case the sleeves 14 are additionally welded to the flange. The sleeves 14 are guided through the bottom and top shell 8a, 8b of the outer pipe 8 and are welded to a reinforcing metal sheet 20 resting on the top shell 8b as well as to the top shell 8b. The fastening screws 16 provided with a screwhead 22 are fitted from the top side of the exhaust gas manifold 2, which is freely accessible for the mounting, into the sleeves 14 and are screwed into the fastening flange 12 of the exhaust gas turbocharger 4. For this purpose, openings 24 provided with a thread are provided in the flange 12, in which openings 24 the fastening screws 16 are screwed.

The material for the fastening screws 16 preferably consists of a tempering steel, such as 40CrMoV47V, while the sleeve material consists of special steel, such as X12Cr13.

The exhaust gas turbocharger 4 consists essentially of a turbine housing 26, a bearing housing 28 for the rotor runner, a compressor housing 30 receiving the compressor impeller, an air inlet connection piece 32 and an air outlet connection piece 34. Furthermore, a so-called waste gate receptacle 36 is shown by means of which the charge pressure can be controlled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for fastening an exhaust gas turbocharger to an exhaust gas manifold of an internal-combustion engine, having a manifold flange provided at the exhaust gas manifold, on which manifold flange an exhaust gas turbocharger is fastened which is also provided with a flange surface, wherein the manifold flange is provided on one side of the exhaust gas manifold and is connected with sleeves which are fixedly connected to the exhaust gas manifold and lead to an opposite side of the exhaust gas manifold, in which sleeves fastening screws are guided for the fastening of the exhaust gas turbocharger.

2. The arrangement according to claim 1, wherein the sleeves reach through the exhaust gas manifold and are connected with the exhaust gas manifold on a top side of the latter.

3. The arrangement according to claim 2, wherein the sleeves have fastening connection pieces which are received in fastening openings of the manifold flange, the sleeves being connected with the manifold flange in a substance-locking manner.

4. The arrangement according to claim 3, wherein the exhaust gas manifold is constructed as a double pipe, the sleeves reaching through an outer pipe of the exhaust gas manifold.

5. The arrangement according to claim 2, wherein the exhaust gas manifold is constructed as a double pipe, the sleeves reaching through an outer pipe of the exhaust gas manifold.

6. The arrangement according to claim 2, wherein the materials for the fastening screws and for the sleeves have the same or similar coefficients of thermal expansion.

7. The arrangement according to claim 2, wherein the fastening screws are fitted into the sleeves from the top side of the exhaust gas manifold and are screwed into the flange of the exhaust gas turbocharger.

8. The arrangement according to claim 1, wherein the sleeves have fastening connection pieces which are received in fastening openings of the manifold flange, the sleeves being connected with the manifold flange in a substance-locking manner.

9. The arrangment according to claim 8, wherein the exhaust gas manifold is constructed as a double pipe, the sleeves reaching through an outer pipe of the exhaust gas manifold.

10. The arrangement according to claim 8, wherein the materials for the fastening screws and for the sleeves have the same or similar coefficients of thermal expansion.

11. The arrangement according to claim 8, wherein the fastening screws are fitted into the sleeves from the top side of the exhaust gas manifold and are screwed into the flange of the exhaust gas turbocharger.

12. The arrangement according to claim 1, wherein the exhaust gas manifold is constructed as a double pipe, the sleeves reaching through an outer pipe of the exhaust gas manifold.

13. The arrangement according to claim 12, wherein the materials for the fastening screws and for the sleeves have the same or similar coefficients of thermal expansion.

14. The arrangement according to claim 12, wherein the fastening screws are fitted into the sleeves from the top side of the exhaust gas manifold and are screwed into the flange of the exhaust gas turbocharger.

15. The arrangement according to claim 1, wherein the materials for the fastening screws and for the sleeves have the same or similar coefficients of thermal expansion.

16. The arrangement according to claim 15, wherein the fastening screws are fitted into the sleeves from the top side of the exhaust gas manifold and are screwed into the flange of the exhaust gas turbocharger.

17. The arrangement according to claim 1, wherein the fastening screws are fitted into the sleeves from the top side of the exhaust gas manifold and are screwed into the flange of the exhaust gas turbocharger.

18. An assembly for an internal-combustion engine comprising:

an exhaust gas manifold having a manifold flange, an exhaust gas turbocharger having a turbo charger flange abuttingly engageable in use with the manifold flange, a plurality of sleeves extending between the manifold flange and a side of the manifold facing away from the manifold flange, said sleeves being fixedly connected with the exhaust gas manifold, and fastening screws extend through the respective sleeves and operable to fasten the exhaust gas manifold and exhaust gas turbocharger with clamping together of the manifold flange and turbocharger flange.

19. The assembly according to claim 18, wherein the exhaust gas manifold is constructed as a double pipe, the sleeves reaching through an outer pipe of the exhaust gas manifold.

20. The assembly according to claim 19, wherein the fastening screws are fitted into the sleeves from the top side of the exhaust gas manifold and are screwed into the flange of the exhaust gas turbocharger.

21. The assembly according to claim 18, wherein the fastening screws are fitted into the sleeves from the top side of the exhaust gas manifold and are screwed into the flange of the exhaust gas turbocharger.

22. An arrangement for fastening an exhaust gas turbocharger to an exhaust gas manifold of an internal-combustion engine, having a manifold flange provided at the exhaust gas manifold, on which manifold flange an exhaust gas turbocharger is fastened which is also provided with a flange surface, wherein the manifold flange is provided on one side of the exhaust gas manifold and is connected with sleeves leading to an opposite side of the exhaust gas manifold, in which sleeves fastening screws are guided for the fastening of the exhaust gas turbocharger, and wherein the sleeves have fastening connection pieces which are received in fastening openings of the manifold flange, the sleeves being connected with the manifold flange in a substance-locking manner.

23. An arrangement for fastening an exhaust gas turbocharger to an exhaust gas manifold of an internal-combustion engine, having a manifold flange provided at the exhaust gas manifold, on which manifold flange an exhaust gas turbocharger is fastened which is also provided with a flange surface, wherein the manifold flange is provided on one side of the exhaust gas manifold and is connected with sleeves leading to an opposite side of the exhaust gas manifold, in which sleeves fastening screws are guided for the fastening of the exhaust gas turbocharger, wherein the sleeves reach through the exhaust gas manifold and are connected with the exhaust gas manifold on a top side of the latter, and wherein the sleeves have fastening connection pieces which are received in fastening openings of the manifold flange, the sleeves being connected with the manifold flange in a substance-locking manner.

24. An arrangement for fastening an exhaust gas turbocharger to an exhaust gas manifold of an internal-combustion engine, having a manifold flange provided at the exhaust gas manifold, on which manifold flange an exhaust gas turbocharger is fastened which is also provided with a flange surface, wherein the manifold flange is provided on one side of the exhaust gas manifold and is connected with sleeves leading to an opposite side of the exhaust gas manifold, in which sleeves fastening screws are guided for the fastening of the exhaust gas turbocharger, wherein the sleeves reach through the exhaust gas manifold and are connected with the exhaust gas manifold on a top side of the latter, and wherein the exhaust gas manifold is constructed as a double pipe, the sleeves reaching through an outer pipe of the exhaust gas manifold.

25. An arrangement for fastening an exhaust gas turbocharger to an exhaust gas manifold of an internal-combustion engine, having a manifold flange provided at the exhaust gas manifold, on which manifold flange an exhaust gas turbocharger is fastened which is also provided with a flange surface, wherein the manifold flange is provided on one side of the exhaust gas manifold and is connected with sleeves leading to an opposite side of the exhaust gas manifold, in which sleeves fastening screws are guided for the fastening of the exhaust gas turbocharger, and wherein the sleeves reach through the exhaust gas manifold and are connected with the exhaust gas manifold on a top side of the latter, and wherein the materials for the fastening screws and for the sleeves have the same or similar coefficients of thermal expansion.

26. An arrangement for fastening an exhaust gas turbocharger to an exhaust gas manifold of an internal-combustion engine, having a manifold flange provided at the exhaust gas manifold, on which manifold flange an exhaust gas turbocharger is fastened which is also provided with a flange surface, wherein the manifold flange is provided on one side of the exhaust gas manifold and is connected with sleeves leading to an opposite side of the exhaust gas manifold, in which sleeves fastening screws are guided for the fastening of the exhaust gas turbocharger, and wherein the fastening screws are fitted into the sleeves from the top side of the exhaust gas manifold and are screwed into the flange of the exhaust gas turbocharger.

27. An assembly for an internal-combustion engine comprising:

an exhaust gas manifold having a manifold flange, an exhaust gas turbocharger having a turbo charger flange abuttingly engageable in use with the manifold flange, a plurality of sleeves extending between the manifold flange and a side of the manifold facing away from the manifold flange, and fastening screws extend through the respective sleeves and operable to fasten the exhaust gas manifold and exhaust gas turbocharger with clamping together of the manifold flange and turbocharger flange, and wherein the fastening screws are fitted into the sleeves from the top side of the exhaust gas manifold and are screwed into the flange of the exhaust gas turbocharger.

* * * * *